United States Patent [19]

Meynier

[11] Patent Number: 5,035,297
[45] Date of Patent: Jul. 30, 1991

[54] ANTI-BOUNCE DEVICE FOR A MASS STRIKING A TARGET ELEMENT

[75] Inventor: Patrick Meynier, Chatou, France

[73] Assignee: Institut Francais du Petrole, Rueil Malmaison, France

[21] Appl. No.: 511,766

[22] Filed: Apr. 20, 1990

[30] Foreign Application Priority Data

Apr. 20, 1989 [FR] France ............... 89 05386

[51] Int. Cl.⁵ ............................................. G01V 1/40
[52] U.S. Cl. ................................. 181/106; 181/102; 181/121; 367/912
[58] Field of Search ............... 181/102, 106, 113, 121; 367/25, 86, 912; 175/135; 173/89, 102

[56] References Cited

U.S. PATENT DOCUMENTS

| Re. 26,825 | 3/1970 | Kenney | 181/102 |
|---|---|---|---|
| 2,495,460 | 1/1950 | Koucky | 42/16 |
| 3,130,809 | 4/1964 | Flatow | 367/86 |
| 3,277,977 | 10/1966 | Silverman | 367/86 |
| 3,283,435 | 11/1966 | Koch | 89/198 |
| 3,283,844 | 11/1966 | Peterson | 181/121 |
| 3,367,443 | 2/1968 | Mayne | 181/401 |
| 4,053,729 | 10/1977 | Reiter | 267/159 |
| 4,064,964 | 12/1977 | Norden | 181/121 |
| 4,124,090 | 11/1978 | Reynolds et al. | 181/121 |
| 4,205,731 | 6/1980 | Cholet et al. | 181/121 |
| 4,648,478 | 3/1987 | Dedole et al. | 181/106 |
| 4,770,268 | 9/1988 | Magneville | 181/106 |
| 4,796,723 | 1/1989 | Laurent et al. | 181/102 |

Primary Examiner—Nelson Moskowitz
Attorney, Agent, or Firm—Antonelli, Terry, Stout & Kraus

[57] ABSTRACT

An anti-bounce device for a mass striking a target element, with the device including a counter mass and a linking arrangement for holding the counter mass spaced from the mass and a braking arrangement for delaying the counter mass so as to put the counter mass in phase opposition with the mass as the mass bounces after impact thereby dissipating any bouncing force. The linking arrangement may take the form of a volume of fluid in a chamber provided between the mass and counter mass, and the linking arrangement and braking arrangement may also include a layer of a damping material or deformable or flexible elements acting by friction.

7 Claims, 2 Drawing Sheets

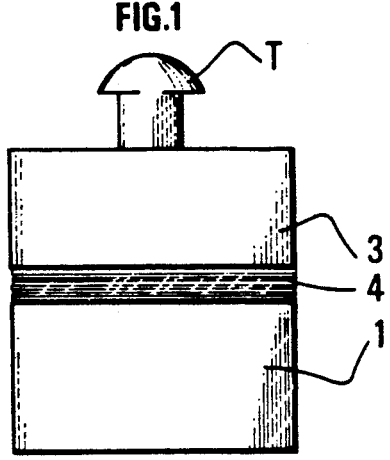
FIG.1
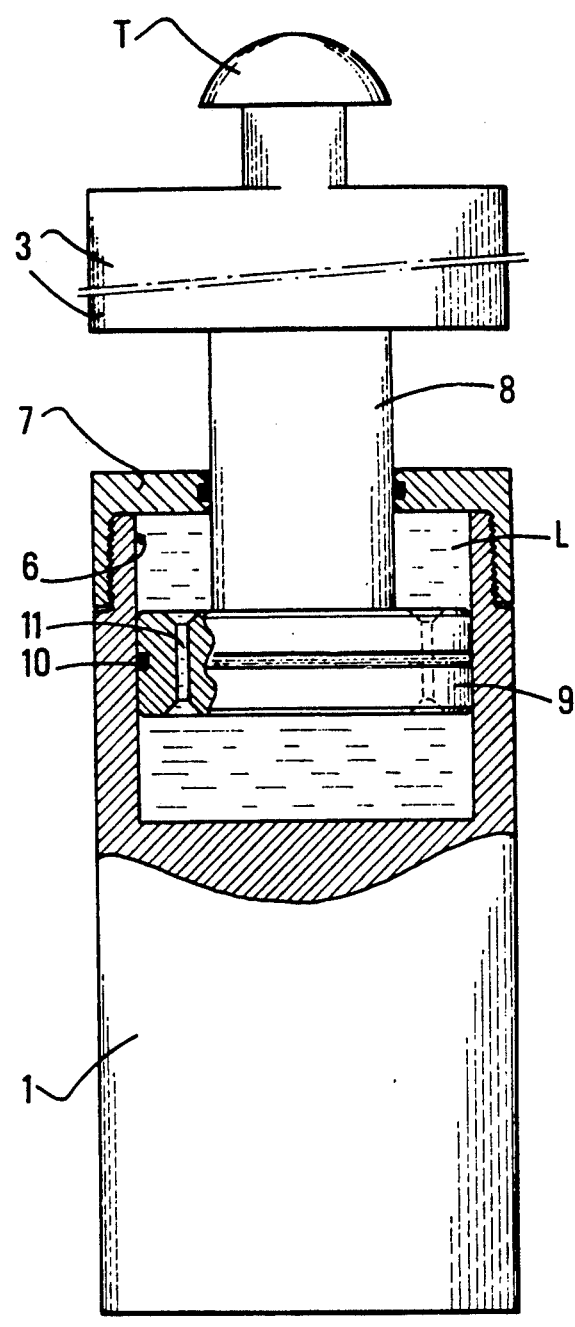
FIG.3
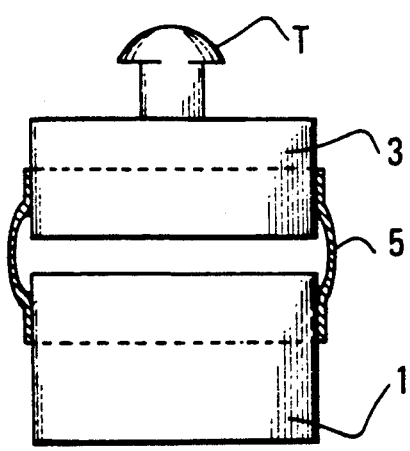
FIG.2

ANTI-BOUNCE DEVICE FOR A MASS STRIKING A TARGET ELEMENT

BACKGROUND OF THE INVENTION

The object of the present invention is an anti-bounce device for a mass striking a target element and generating seismic impulses.

The device according to the invention is particularly useful for achieving impact seismic sources which generate in the ground seismic waves through the percussion of a moving mass against a target element which it is hurled at by the effect of gravity and/or motive means. A percussion source for seismic prospecting on land comprising a mass falling along a guiding element towards a target element anchored against the ground surface is described in French Patent No. 2,398,316. Another percussion source, more particularly adapted for being used in a well bore, is described in French Patent No. 2,552,553. The use of mot or means for throwing a mass against a target element anchored in a well is described in French Patent No. 2,558,601.

When the mass drops freely, it generally bounces after its impact against the associated target element and it then comes back and strikes it once or several times with decreasing strengths. The "signature" of the seismic source, i.e the strength of the emitted impulses, thus comprises in this case several secondary impulses of decreasing amplitudes following the main impulse and this has the effect of disturbing the seismic recordings corresponding to the seismic reflections of the emitted impact pulse on the subsoil discontinuities.

Through French Patent No. 2,509,052, a device is known which avoids the multiple shocks on a target element, connected with the ground surface, of a mass guided in its fall by guiding means, these multiple shocks being due to the bounces of the mass after its first impact. This device essentially comprises a deformable element fastened to the guiding means and control means adapted for applying the deformable element against the side wall of the mass after its first bounce thereby immobilizing it before it falls down again. The control means comprise for example a mobile element which is radially moved by the action of a hydraulic jack and an impact detector delivering a control signal resulting in the tripping of the jack.

This device very efficiently blocks any further fall of the mass but, due to its transverse position perpendicular to the longitudinal axis of the guiding means, its space requirement would not be compatible with the generally limited dimensions of the drill holes where the well seismic sources are taken down.

Through published French Patent Application 2,631,458 an anti-bounce device is known which is well-adapted to the cases where the lateral space around the direction of fall is limited, and which is characterized by the use of electromagnetic means in order to exert an intermittent attractive face on the mass. As a result the mass sticks to the target element that it has just struck at the end of the fall. Such a device is suitable to any application where it is possible to use electromagnetic means and to connect them with feeding cables to a electric source.

SUMMARY OF THE INVENTION

The device according to the invention avoid the multiple shocks of a mass striking a target element without having to use magnetic or electromagnetic forces to stop the mass after its impact. By the use of the device, it is possible to obtain very short seismic pulses which are favorable in particular to seismic prospecting.

The present invention is characterized by a counter-mass which is placed behind the mass in relation to the direction of displacement towards the target element, the counter-mass being movable in relation to the mass, linking means to hold the mass and the counter-mass spaced apart during their moving in the same direction towards the target element, as well as braking means selected according to the respective features of the mass and of the counter-mass, in order to delay the latter in relation to the mass whereby their motions are substantially be in opposition of phase and act against each other.

The linking means and the braking means comprise, for example, a layer of a damping material the stiffness of which is selected in order to substantially cancel the back motion of the mass after its impact against the target element.

The linking means may comprise a volume of fluid contained in a chamber provided between the mass and the counter-mass, and the braking means, at least one passageway with a calibrated diameter allowing an outflow of the fluid out of the chamber under the action of the inertia force of said counter-mass.

The linking means and the braking means may also comprise at least one flexible part fastened to the mass or the counter-mass and holding the other one by friction. This flexible part is for example a deformable sleeve or a set of spring leaves leaning against the side wall of the mass.

It has been possible to verify from experience that, through an appropriate selection of the damping layer between mass and counter-mass, of the deformable sleeve or of the section of the outlet ports of the braking fluid, it was practically possible to suppress any bounce of the mass and this in a definitely repetitive way. The achievement and the implementation of an impact well seismic source is easier with such a constituted mass.

According to a possible application procedure, the target element is firmly attached to an extended body associated with retractable anchoring means in order to connect the extended body with the walls of a well or a drill hole, the mass is equipped with a hold for retractable holding means and it can be moved within the body between a lower position corresponding to the impact against the target element and a higher position where it is distant from the latter.

It is possible to use retractable holding means to displace the mass in relation to the body, the displacement stroke thereof being sufficient to convey the mass between its lower position and its higher position and thus to connect the holding means to a lifting device.

The initial spacing between the mass and the counter-mass is simply restored, whether the damping material recovers its normal volume after each shock, or by traction on the counter-mass by the retractable holding means. The traction forces are sufficient to overcome the friction forces of the flexible parts or else to restore the initial volume of fluid in the chamber between the mass and the counter-mass.

BRIEF DESCRIPTION OF THE DRAWINGS

Other features and advantages of the method and of the device according to the invention will be clear from reading the description of embodiments given by way of non limitative examples with reference to the appended drawings in which:

FIG. 1 shows an embodiment of the invention where the linking means and the braking means comprise a layer of a damping material;

FIG. 2 shows a mass equipped with linking means and braking means comprising lateral springs rubbing against a part of the mass;

FIG. 3 shows a mass equipped with hydraulic linking and braking means; and

DESCRIPTION OF THE PREFERRED EMBODIMENTS

Figure 4:
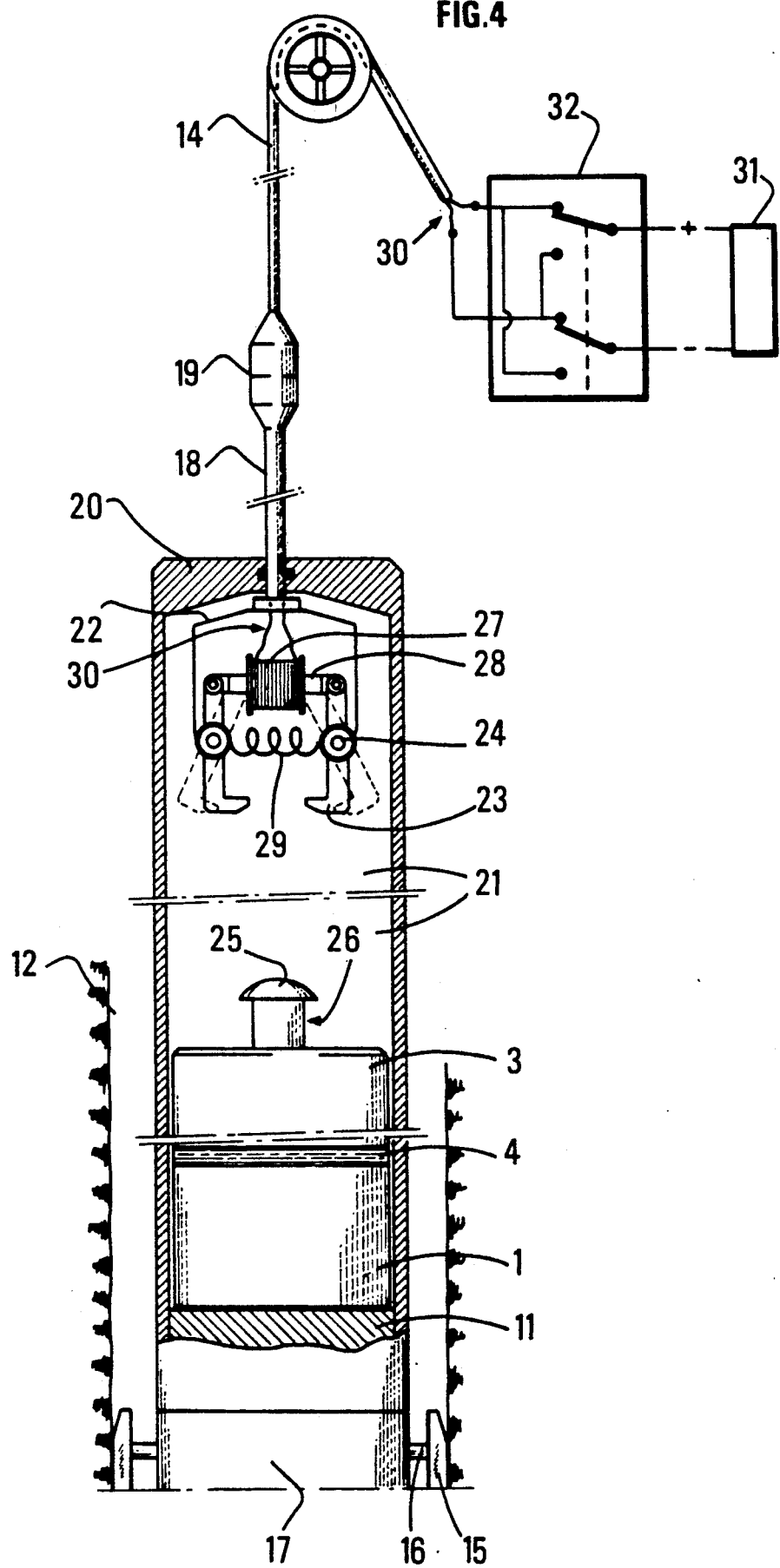
FIG. 4 shows a first example of an association of the mass and of the anti-bounce device with a unit allowing to apply the impulse stresses to the walls of a well.

The anti-bounce device according to the invention is associated with a mass 1 adapted for being thrown against an impact wall 2. It can, for example, be a mass accelerated by the gravitational force and/or any motor means. It comprises a counter-mass 3, means for linking the mass and the counter-mass and means for braking the latter. According to the embodiment of FIG. 1, the linking means and the braking means consist of a layer 4 made of a damping material which is inserted between the mass 1 and the counter-mass 3 and sticks to them. The layer 4 holds the mass and the counter-mass at a given distance from one another. When the mass is stopped in its motion by the impact wall 2 and bounces back, the counter-mass 3 continues its movement forward while it is slowed down by the damping layer 4. The mass and the counter-mass are then out of phase and act against each other. The ratio of both masses, the thickness of the damping layer and the quality of the damping material are selected so that the kinetic energy of the backward motion of one be substantially equal to the kinetic energy which is kept by the other one. In actual practice, it is possible to totally suppress the bounces of the mass 2.

According to the embodiment of FIG. 2, the linking means and the braking means consist of a deformable sleeves that is, for example, fastened to the counter-mass 3 and fitted in the end of the mass. The friction forces which the sleeve 5 exerts on the side wall of mass 1 are sufficient to keep it apart from the counter-mass 3. The inertia force of counter-mass 3 is still sufficient to overcome the friction forces and, as previously, the counter-mass 3 continues its motion forwards while the mass 1 goes backwards after the shock against the impact wall 2. Here again, the bouncing of the mass 1 is practically annihilated. The deformable sleeve 5 may also be replaced by one or several flexible leaves that are, for example, fixed to counter-mass 3 and laterally gripping mass 2.

According to the embodiment of FIG. 3, the linking means consist of a volume of fluid, for example, oil, contained in a chamber provided between the mass 1 and the counter-mass 3. To that effect, a cylindrical cavity 6 closed by a cover 7 is provided in mass 1, on the side opposite to the impact wall 2. The counter-mass 3 is equipped with a rod 8 entering the cavity by way of an opening through cover 7, and extended by a piston 9 the section of which is adapted for the section of cavity 6 that is equipped with filler joints 10 on its circumference. One or several parts or channels 11 with a calibrated section pass through the piston 9 and connect the parts of the chamber on either side of piston 9 together. The braking force is exerted on counter-mass 3 by the lamination of the liquid through the ports or channels 11. When mass 1 strikes wall 2, its bouncing force is again annihilated by the remaining inertia force of counter-mass 3.

The restoring of the initial spacing between the mass and the counter-mass is obtained with the embodiments of FIGS. 2 and 3, by exerting a traction on counter-mass 3. To this effect, the counter-mass can be equipped with a hooking head T for a pulling device like the one shown in FIG. 4.

According to the implementation of FIG. 4, mass 1, which is fitted with the anti-bounce device according to one of the previously described embodiments, is adapted for striking a target element 11 linked with the wall of a well or a drill hole 12.

Mass 1 moves following a straight line within an extended body 13 that is taken down in the well 12 at the end of an electric carrying cable 14 comprising supply lines. Towards its end opposite cable 14, the body 13 is associated with anchoring skids 15. These skids are fixed at the end of the rods 16 of jacks (not shown) which are radially arranged in a compartment 17 containing a hydraulic operating system. Such a hydraulic system is described in the previously cited French Patent No. 2,558,601.

Mass 1, equipped with its anti-bounce device, is displaced from an impact position in contact with target element 11 into a loading position by lifting means. These means comprise a rigid rod 18 linked to cable 14 by a mechanical and electrical connector 19. The rod 18 crosses the upper terminal wall 20 of the body through an opening and inside, in the cavity 21 where the mass moves, it supports retractable fastening means. These means comprise a rigid support 22. Two hooks 23 can swivel on pins 24 that are fastened to support 22 between a proximity position and a spacing position (represented with dashed lines on FIG. 4). On its upper side, counter-mass 3 comprises a head 25 equipped with a circular groove 26 into which the tips of hooks 23 can fit in the proximity position. Thus, they make mass 3 interdependent from fastening support 22. The swiveling of hooks 23 towards their spacing position is obtained, for example, through the excitation of electromagnets 27 with mobile cores 28. These cores are radially arranged in the swiveling plane of hooks 23 and linked to these ones. A return spring 29 tends to hold hooks 23 in their proximity position.

The excitation of the electromagnets 27 is provided by conductors 30 going through the axis of the rigid rod 18 and linked within connector 19 to conducting lines of the electric carrying cable 14.

Other electric conductors (not shown) allow the transmission of electric currents and of control signals to the hydraulic system (not shown) operating jacks 15.

At the opposite end of electric carrying cable 14, the conductors 30 are connected to the electric power source 31 by a switch 32. Their connection is such that, in a first position of switch 32, the electromagnets 27 move the hooks 23 away from one another. In the second position of switch 32, the same electromagnets 27 drive the hooks 23 back towards their proximity position.

Since the seismic source is anchored in the well through the spacing of the anchoring skids 15,.switch 32 is placed in its second position and cable 14 is loosened so that the rigid support 22 goes down along cavity 21 towards counter-mass 3 which is in its lower position against target element 11. While contacting the head 25, the hooks 23 move away from one another and fit into groove 26 of the latter.

Through a traction on electric carrying cable 14, the support 22 and the mass-counter-mass unit which is coupled to it are taken up to a high position. At the time selected for the release, switch 32 is placed in its first position. Electromagnets 27 separate hooks 23 which keep the mass. 10 Once released, the mass falls along cavity 18 and strongly strikes the target element.

The anti-bounce device according to any one of the embodiments shown in FIGS. 1-3 suppresses all the secondary impacts. The obtained sharper impact force is transmitted to the formations around the well by the anchoring skids 15.

It is also possible to use the lifting means described in French Patent No. 2,590,994, where the uncoupling of the mass-counter-mass unit is provided at the end of the return stroke by contacting hooks such as hooks 23 against supporting walls interdependent from the body of the seismic source, the lifting force exerted from the surface on the cable supporting the source being sufficient for the hooks to separate from one another and releases mass 1.

I claim:

1. An anti-bounce device for a seismic source for generation seismic pulses in a bore hole by impacting a target element in contact with the earth by a mass dropping from a first position, the anti-bounce device comprising a counter-mass for preventing a bouncing of the mass means for loosely holding and integrally connecting the counter-mass at a predetermined distance from said mass and behind the same as viewed in a dropping direction, and braking means for delaying the movement of the counter mass with respect to the mass after impact thereby putting the mass and counter mass in phase opposition, whereby secondary impacts of the mass on said target element are suppressed.

2. A seismic source for generating seismic pulses in a bore hole by impacting a target element in contact with the earth with a mass dropping from a first position, said seismic source being provided with an anti-bounce device for preventing any bouncing of said mass and comprising a counter-mass, and loose holding and integrally connecting means for holding by friction the counter mass at a limited distance spaced from said mass and behind the same with respect to a dropping direction, a friction force is selected for delaying the counter-mass movement with respect to the mass after impact thereof thereby putting the mass and the counter-mass in phase opposition and bringing the same closer to each other, whereby secondary impacts of the mass on the target element are suppressed.

3. A device as claimed in claim 2, wherein said loose holding means includes spring leads leaning against a side wall of the mass.

4. A device as claimed in claim 2, wherein said loose holding means includes a deformable sleeve laterally rubbing against the mass.

5. A seismic source for generating seismic pulses in a bore hole by impacting a target element in contact with the earth with a mass dropping from a first position, said target element being interdependent from an elongated body associated with retractable anchoring means of the seismic source for coupling the elongated body with walls of the bore hole, said mass being movable within the elongated body between the first position and a lower impact position spaced from said first position, and an anti-bounce device comprising a counter mass, holding means for loosely holding and integrally connecting the counter mass at a distance spaced from the mass and behind the same with respect to a dropping direction, and braking means for delaying the counter-mass movement with respect to the mass after impact thereof thereby putting the mass and the counter-mass in phase opposition and bringing the same closer to each other, whereby secondary impacts of the mass on the target element are suppressed.

6. A seismic source as claimed in claim 5, wherein the holding means are movable in relation to the elongated body and have a displacement stroke sufficient to displace the mass between the lower impact position and the first position.

7. A device as claimed in claim 6, wherein the holding means are connected to a lifting device.

* * * * *